(12) United States Patent
Howell et al.

(10) Patent No.: US 11,917,415 B2
(45) Date of Patent: Feb. 27, 2024

(54) REMOTE CONTROL SYSTEM

(71) Applicant: Support Robotics Ltd., Cambridgeshire (GB)

(72) Inventors: Emlyn Howell, Cambridge (GB); William Gibson, Cambridge (GB)

(73) Assignee: Support Robotics Ltd, Cambridge (GB)

( * ) Notice: Subject to any disclaimer, the term of this patent is extended or adjusted under 35 U.S.C. 154(b) by 399 days.

(21) Appl. No.: 17/264,395

(22) PCT Filed: Jul. 30, 2019

(86) PCT No.: PCT/GB2019/052132
§ 371 (c)(1),
(2) Date: Jan. 29, 2021

(87) PCT Pub. No.: WO2020/025946
PCT Pub. Date: Feb. 6, 2020

(65) Prior Publication Data
US 2021/0297863 A1    Sep. 23, 2021

(30) Foreign Application Priority Data

Jul. 30, 2018 (GB) ..................................... 1812398

(51) Int. Cl.
*H04W 12/50* (2021.01)
*H04W 12/06* (2021.01)
(Continued)

(52) U.S. Cl.
CPC ......... *H04W 12/50* (2021.01); *G06F 11/2294* (2013.01); *H04W 12/04* (2013.01);
(Continued)

(58) Field of Classification Search
CPC ... H04W 12/50; H04W 12/102; H04W 12/04; H04W 12/06; H04W 24/02; G06F 11/2294
See application file for complete search history.

(56) References Cited

U.S. PATENT DOCUMENTS

| | | | |
|---|---|---|---|
| 6,260,160 B1 | 7/2001 | Beyda et al. | |
| 9,210,646 B2 * | 12/2015 | Ruffini | ................... H04W 40/28 |

(Continued)

FOREIGN PATENT DOCUMENTS

| | | |
|---|---|---|
| EP | 1641184 A1 | 3/2006 |
| WO | 2013151808 A1 | 10/2013 |
| WO | 2018119782 A1 | 7/2018 |

OTHER PUBLICATIONS

Abasset, "MPS Monitor SDS: remote maintenance and proactive support on HP printers", pp. 1-2, retrieved on Nov. 5, 2019, retrieved from internet https://www.mpsmonitor.com/blog/hp-printers-sds-remote-maintenance/.

*Primary Examiner* — Khawar Iqbal
(74) *Attorney, Agent, or Firm* — COATS & BENNETT, PLLC

(57) ABSTRACT

Remote control system is disclosed. The present techniques relate to a system and a method for improving connection between two devices, e.g. to enable one device to control the other. The method comprises receiving, at a remote computing device, a request from a secondary user device to diagnose a fault with the primary user device. The request is received on a first communication channel. The method further comprises a step of connecting, in response to the request, the remote computing device with the secondary user device. This is performed by using a secure communication channel which is different to the first communication channel. The method further comprises a step of sending a command message for the primary user device from (Continued)

the remote computing device to the secondary user device via the secure communication channel. Any response to the command message is then received from the secondary user device via the secure communication channel. The response is used at least in part to diagnose the fault.

15 Claims, 11 Drawing Sheets

(51) Int. Cl.
  *H04W 12/102* (2021.01)
  *G06F 11/22* (2006.01)
  *H04W 12/04* (2021.01)
  *H04W 24/02* (2009.01)
(52) U.S. Cl.
  CPC ......... *H04W 12/06* (2013.01); *H04W 12/102* (2021.01); *H04W 24/02* (2013.01)

(56) References Cited

U.S. PATENT DOCUMENTS

| | | | | |
|---|---|---|---|---|
| 9,634,857 | B2* | 4/2017 | Lamb | H04L 41/0659 |
| 10,153,957 | B2* | 12/2018 | Song | H04L 43/0847 |
| 2014/0376385 | A1* | 12/2014 | Boss | G06F 11/2294 |
| | | | | 370/242 |
| 2015/0016241 | A1* | 1/2015 | Ruffini | H04L 45/22 |
| | | | | 370/216 |
| 2016/0248649 | A1* | 8/2016 | Song | H04W 12/06 |
| 2017/0289159 | A1* | 10/2017 | Adrangi | H04W 12/02 |
| 2017/0324559 | A1* | 11/2017 | Hu | H04W 12/50 |
| 2018/0317271 | A1* | 11/2018 | Hu | H04L 12/5692 |
| 2020/0012548 | A1* | 1/2020 | Escutia Garcia | G06F 11/3409 |
| 2020/0169453 | A1* | 5/2020 | Cheng | G06F 11/0709 |
| 2020/0296476 | A1* | 9/2020 | Zerfas | H04N 21/2402 |
| 2022/0109997 | A1* | 4/2022 | Freeman | H04W 4/80 |

* cited by examiner

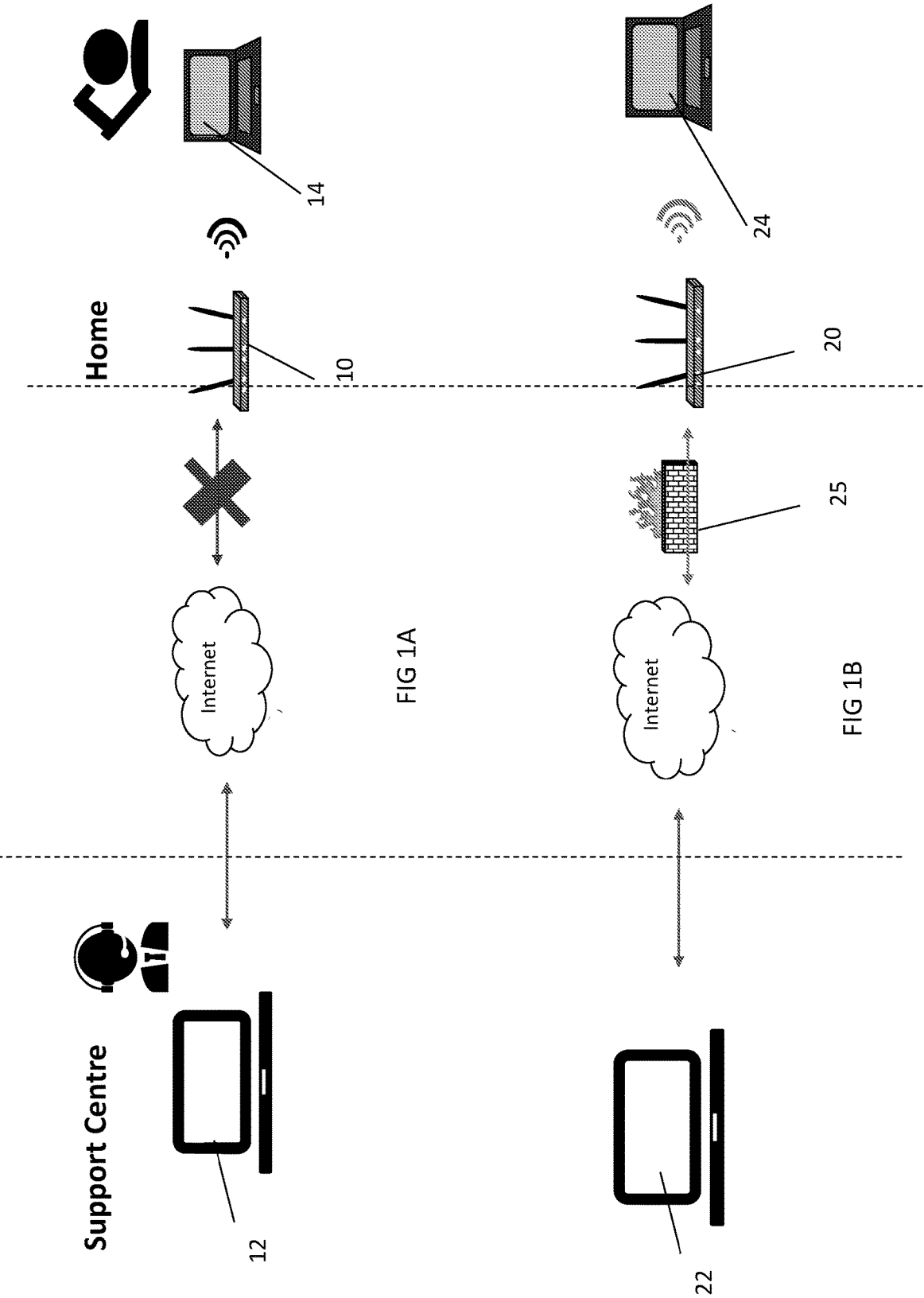

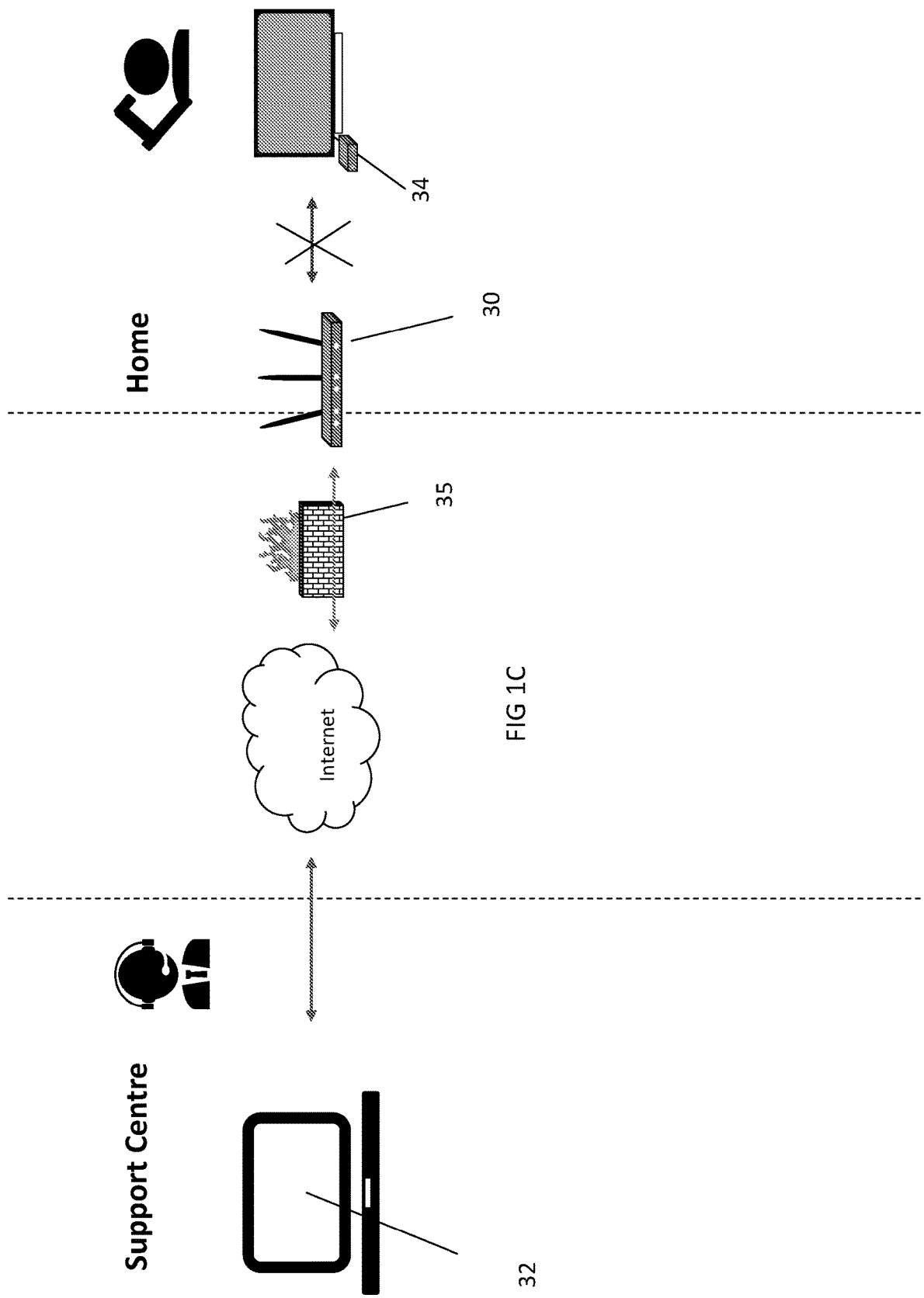

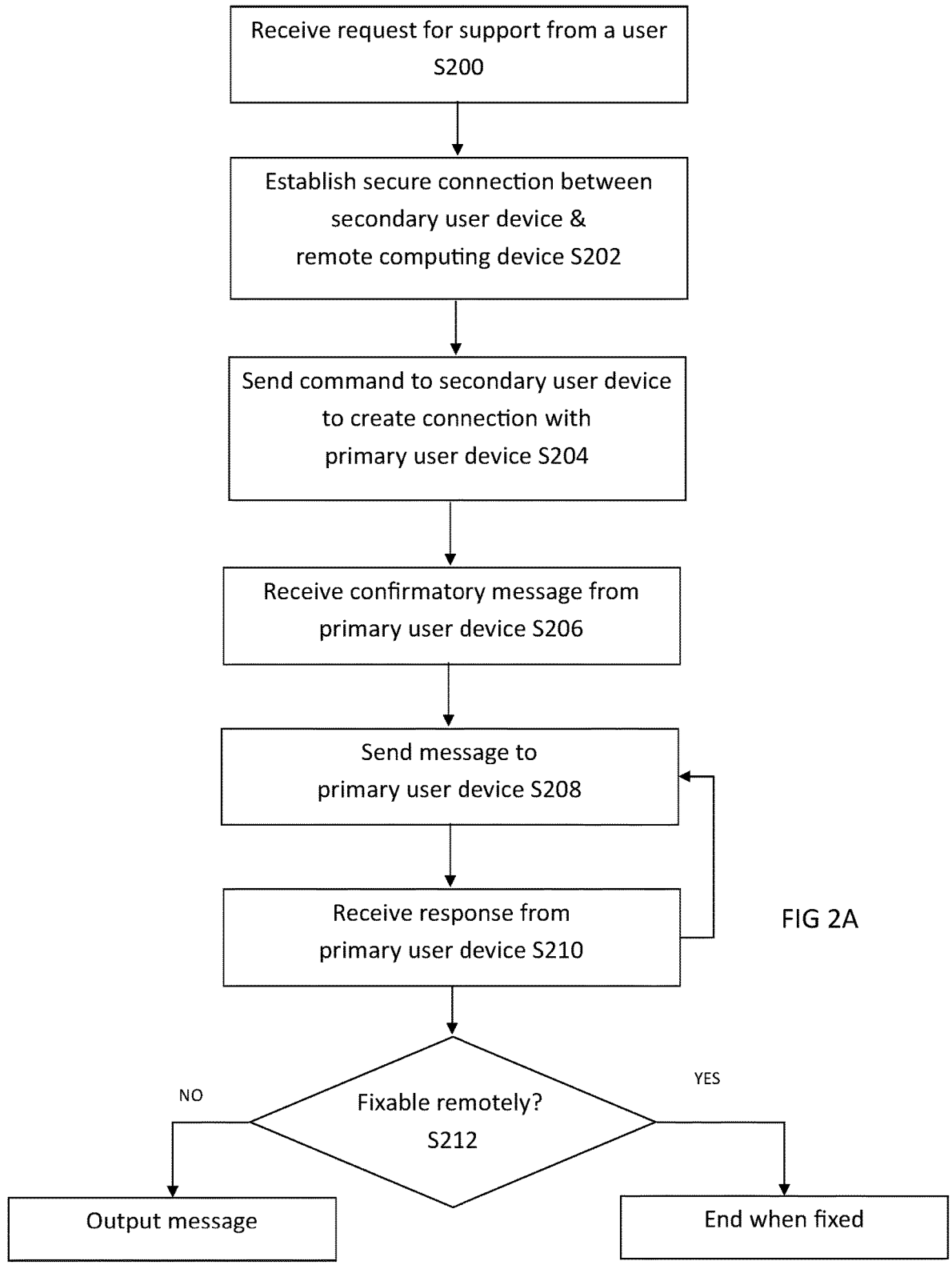

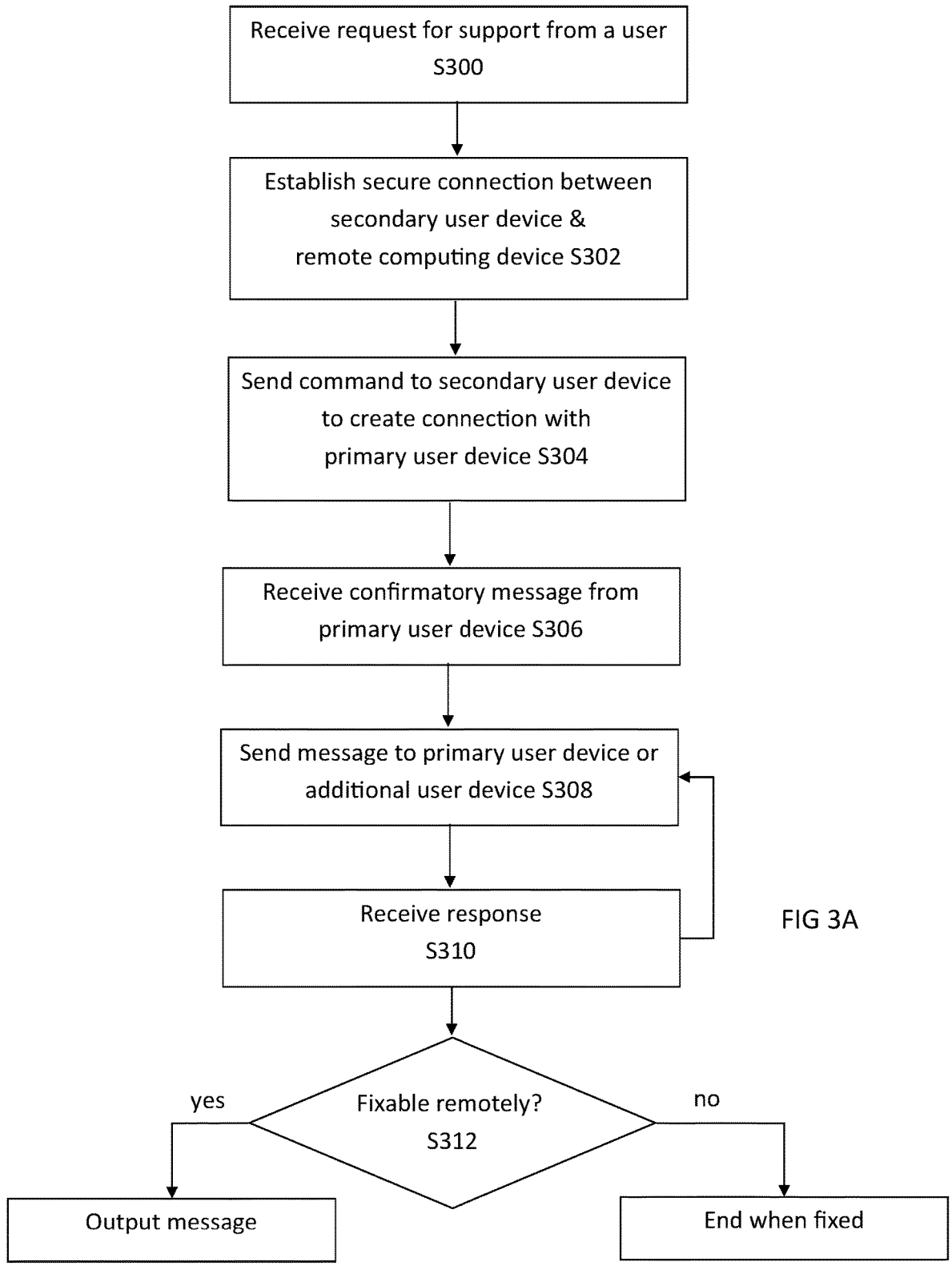

REMOTE CONTROL SYSTEM

TECHNICAL FIELD

The present invention relates to a system and a method for improving connection between two devices, e.g. to enable one device to control the other.

BACKGROUND

Call centre support for user devices often results in low customer satisfaction scores. This can be somewhat improved by using remote support tools, where a human operator can run tests on a user device from a call centre. The remote operator can view results and suggest further action. In some cases, the operator may be able to remotely update settings which may be causing the reported issue or remotely run tests to identify the issue. However, remote updating and/or testing is not possible in all scenarios.

FIGS. 1a to 1c illustrates a scenario in which call centre support is required to help fix issues with a user device which is a router or another electronic device connected to the router. As schematically shown in FIG. 1a, there is a problem with the router 10 which is unable to connect to the internet or with the internet connection itself. Given that the connection between the router 10 and the internet is faulty, the remote computing device 12 of the call centre is unable to connect to the router 10 or any user devices 14 which are served by the router 10.

In FIG. 1b, the router 20 is connected to the internet but has intermittent issues such as providing a weak signal to the user device 24. It is a common security arrangement to place the router 20 behind a firewall 25 when connecting to the internet. An attempt by the remote computing device 22 of the call centre to connect to the router 20 or any user devices 24 connected to the router 20 may then be blocked by the firewall 25 unless the remote computing device 22 is authorised or able to navigate around the firewall 25. In FIG. 1c, the router 30 is successfully connected to the internet but is not connected to the user device 34. As in FIG. 1b, an attempt by the remote computing device 32 of the call centre to connect to the router 30 or the user device 24 may be blocked by a firewall 35.

The present applicant has recognised the need for an alternative solution.

SUMMARY

According to the present invention there is provided an apparatus and method as set forth in the appended claims. Other features of the invention will be apparent from the dependent claims, and the description which follows.

We describe a method of remotely diagnosing a fault with a primary user device, the method comprising: receiving, at a remote computing device, a request from a secondary user device to diagnose a fault with the primary user device, wherein the request is received on a first communication channel; connecting, in response to the request, the remote computing device with the secondary user device using a secure communication channel which is different to the first communication channel; sending a command to the secondary user device to connect to the primary user device using a third communication channel which is different to the secure communication channel; sending a command message for the primary user device from the remote computing device to the secondary user device via the secure communication channel; and receiving, from the secondary user device via the secure communication channel, any response to the command message issued by the primary user device. The response may be used at least in part to diagnose the fault.

The secure communication channel and the third communication channel together form an overarching communication channel between the remote computing device and the primary user device which routes via the secondary user device. This provides an alternative to a direct connection from the remote computing device to the primary user device, e.g. via the internet, which is important when the primary user device is not able to connect to the internet or connects via a firewall. Such a communication channel may be established between the end points on an ad-hoc basis. The secure communication channel may be via one or more relay servers. The use of the intermediaries (e.g. the secondary user device and/or relay servers) provides different hops for a message between the remote computing device and the primary user device. In this way, the overarching communication channel may use different networking protocols and technologies in one or more hops. For example, the secure communication channel may be over a mobile network and the third communication channel may a local wireless communication, e.g. using Wi-Fi or Bluetooth®.

The first communication channel may be created using an app on the secondary user device. For example, the secondary user device may send the request for assistance via the app. Alternatively, the first communication channel may be a different route, e.g. a request via a text message or verbal message. However, the first communication channel is may not be secure.

These steps are carried out by the remote computing device which may be operated by an agent who has been contacted by the user of the primary user device to help diagnose the fault. The remote computing device may be any suitable computing device which is capable of performing the steps above, e.g. a personal computer, tablet or portable device such as a smart phone. Thus, we also describe a remote computing device which is configured to carry out the method described. By remote it is meant that the remote computing device is located in a different location to the primary user device. For example, the primary user device may be in a user's home or workplace and the remote computing device may be in an office for the support service. The primary user device which is faulty may be any device, e.g. a network router, a vehicle management system or a vehicle entertainment system, an additional user device within the user's environment, e.g. a television, a computing device, which may/may not be connected to the network router.

The remote computing device is communicating with the primary user device via the secondary user device. The secondary user device may be any suitable computing device which is connectable to the remote computing device, e.g. a personal computer, tablet or portable device such as a smart phone. Accordingly, there is also a corresponding diagnosis method carried out at the secondary user device. Thus, we also describe a secondary user device which is configured to carry out the method described.

We thus also describe a method of remotely diagnosing a fault with a primary user device, the method comprising: sending a request to diagnose a fault with the primary user device from a secondary user device to a remote computing device, wherein the request is sent over a first communication channel; connecting, in response to the request, the secondary user device with the remote computing device using a secure communication channel which is different to the first communication channel; connecting the secondary user device with the primary user device using a third communication channel which is different to the secure communication channel; receiving, at the secondary user device, a command message for the primary user device from the remote computing device via the secure communication channel; sending the command message from the secondary user device to the primary user device over the third communication; and returning, using the secondary user device, any response to the command message received from the primary user device to the remote computing device.

The following features apply equally to both methods.

At the remote computing device, connecting using a secure communication channel may comprise receiving a pairing code from the secondary user device over a primary channel; sending the received pairing code to a pairing server; and receiving confirmation from the pairing server that the pairing code is valid. Similarly, at the secondary user device, connecting using a secure communication channel may comprise receiving a pairing code at the secondary user device, sending the pairing code to the remote computing device over a primary channel; sending the received pairing code to a pairing server over a secondary channel; and receiving confirmation from the pairing server that the pairing code is valid. The pairing server may validate the pairing code received from the remote computing device by determining whether there is a match with the pairing code received from the secondary user device.

The method at the remote computing device may further comprise encrypting the command message using a key shared with the secondary user device. The key may be a pass code, e.g. a one-time code (OTC) or may be derived from such a pass code. The key may be shared using standard techniques but must be shared direct between the remote and secondary user devices without revealing the key to any other components within the system. The key may be used multiple times but must be kept secret. The method at the secondary user device may comprise decrypting the received command message and sending the command message to the primary user device. In this way, the primary user device may then carry out the instructions in the command message. These instructions cannot be corrupted even if intercepted. The secondary user device may similarly encrypt any response to the remote computing device which may then be decrypted by the secondary user device. The command message may be re-encrypted before being sent to the primary user device. Similarly, the response from the primary user device may be encrypted before being sent to the secondary user device and decrypted before being sent to the remote computing device. Such encryption and decryption may be done via a standard mechanism for the protocol used for the communication between the two devices. For example, HTTPS or Bluetooth encryption may be used.

The command message may be a command to initiate a diagnostic test on the primary user device. The response may thus be a result of such a diagnostic test. The method at the remote computing device may comprise sending, based on the received response, a subsequent command message for the primary user device from the remote computing device to the secondary user device via the secure communication channel; and receiving, from the secondary user device via the secure communication channel, any response to the subsequent command message issued by the primary user device. For example, if the response to the diagnostic test is not conclusive, the subsequent command message may be to run a further diagnostic test. Alternatively, the command message may be a command to change a configuration setting on the primary user device, for example if the response(s) from diagnostic tests is conclusive and the fault is diagnosed or alternatively to enable more diagnostic tests to be run if the fault has not been diagnosed.

The command messages may be different types of commands, e.g. to run diagnostic tests and/or to change configuration settings. These command messages may be communicated using a variety of protocols, without or with encryption as described above. The method may further comprise sending a command message to collect data or information on the environment for the primary user device, e.g. network connection information for the primary user device, to assist in fault diagnosis. Alternatively, such data or information may be automatically collected by the secondary user device without a command message being issued.

The method may further comprise receiving, in response to sending the connection command, confirmation that the primary user device is connected to the secondary user device; and sending the command message after the confirmation is received.

We also describe a computer program product, including a non-transitory computer readable medium (e.g. a removable storage medium such as one or more DVDs, CD-ROMs, disks etc.). The computer program product may be installed by any suitable software installation procedure. The computer readable medium provides at least a portion of the software instructions for the present invention. We also describe a non-transitory computer readable medium carrying program code which when running on a computing device (e.g. the remote computing device or the secondary user device) causes the computing device to carry out the method described above.

BRIEF DESCRIPTION OF DRAWINGS

FIGS. 1A to 1c are schematic block diagrams of systems which are not functioning;

FIG. 2A is a flowchart of a method for improving performance in a system comprising a wireless router;

FIG. 3A is a flowchart of a second method for improving performance in a system comprising a wireless router;

DETAILED DESCRIPTION OF DRAWINGS

As described above, FIGS. 1A to 1C show various systems in which there is a fault with a primary user device in the form of a router 10, 20, 30 and/or a user device connected to the primary user device.

FIG. 2A is a flowchart setting out the steps for a remote computing device to connect to a faulty primary user device, e.g. a router. Once connected, tests may be performed to identify the faults and/or to perform any necessary remedial action(s). In a first step S200, the user contacts the support centre on a secondary user device to request support. As explained in more detail below, a secure connection is then established between a remote computing device of the support centre and the secondary user device (step S202). Once the secure connection has been established, in step S204, the remote computing device sends a command to the secondary user device which creates a connection between the secondary user device and the primary user device. This results in a new communication channel between the remote computing device and the primary user device via the secondary user device.

Once the connection is established, the primary user device may send a confirmatory message which is received by the remote computing device over the new communication channel, i.e. via the secondary user device (step S206). After the connection has been confirmed, the remote computing device can issue commands to the primary user device (step S208) via the secondary user device. The commands may cause tests to run on the primary user device or may change settings on the primary user device. There may be a response from the primary user device to the remote computing device (step S210). It will be appreciated that these steps of sending messages and receiving responses can be repeated until the problem is identified and fixed if possible. The method draws to a conclusion with a determination as to whether the fault is remotely fixable (step S212). If the problem is fixable remotely, the method will terminate with the device being fixed. However, if the problem is not remotely fixable, i.e. a configuration setting to fix the problem cannot be remotely changed or the problem cannot be diagnosed, the method may conclude with a message to instruct the user to seek further assistance.

Figure 2B:
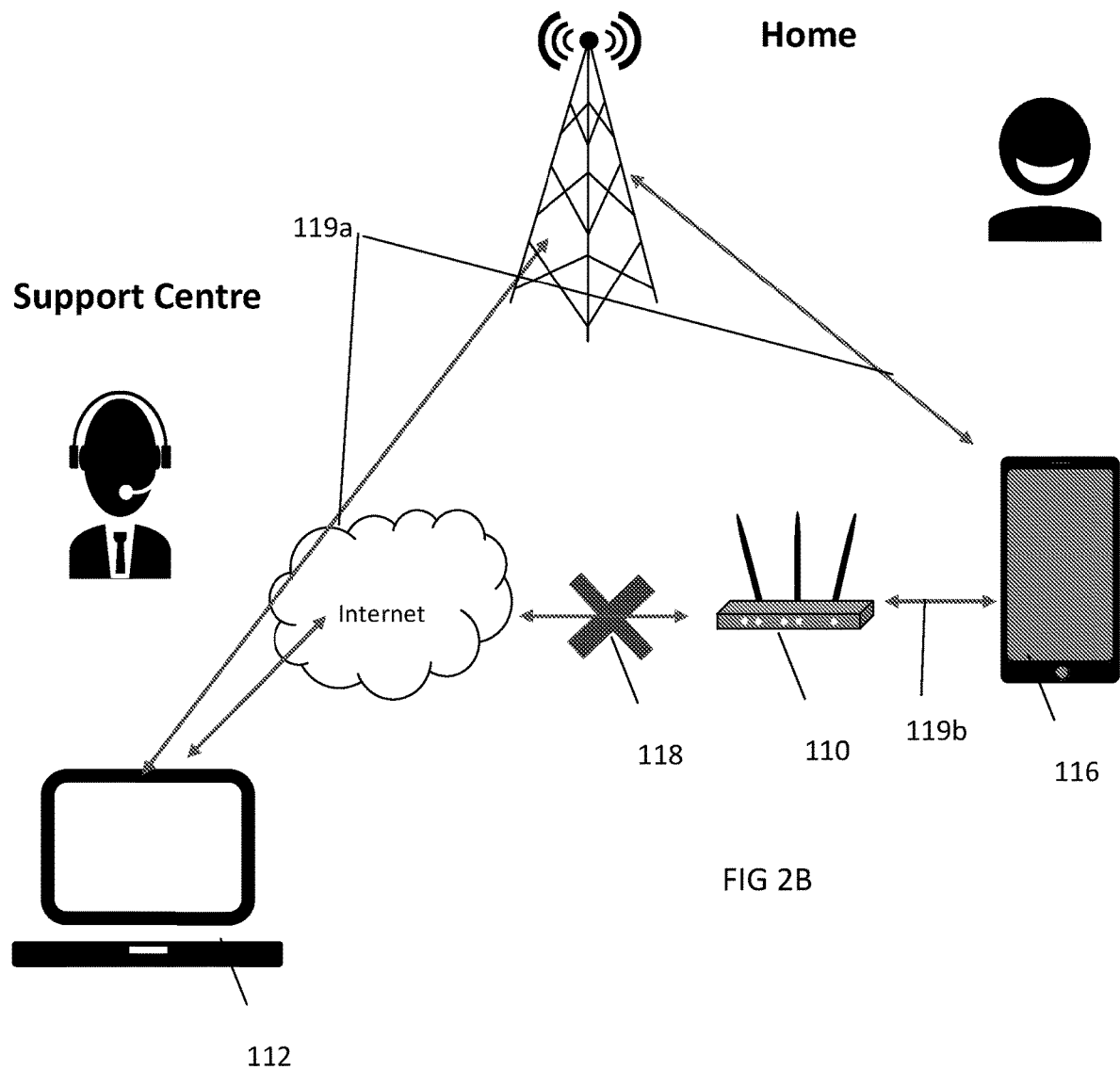
FIG. 2B is a schematic block diagram of a system in which the method of FIG. 2A may be carried out.

FIG. 2B is a schematic block diagram of a system which implements the method of FIG. 2A. The system comprises a primary user device 110 which in this example is a router (e.g. a broadband Wi-Fi router) configured to connect one or more user devices (not shown) to the internet. However, as illustrated by the broken connection 118, the primary user device 110 is not able to connect to the internet. The system also comprises a remote computing device 112 which is located in a support centre which the user contacts to fix the primary user device 110. By remote, it is meant that the computing device 112 is not located near to the primary user device, e.g. not local to or within the user's environment. In light of the broken connection 118, the remote computing device 112 is unable to connect to the primary user device 110 via the internet to directly diagnose any faults. The remote computing device 112 is thus not able to obtain diagnostics from the router 110 and can also not remotely change its configuration if this is needed. In other words, the primary communication channel via the internet between the remote computing device 112 and the primary user device 110 is disabled.

The system also comprises a secondary user device 116 in the form of a mobile device. A mobile device is a portable and typically handheld computing device (or electronic device—the words can be used inter changeably) such as a mobile phone, particularly a smartphone or a small computer, such as a tablet. The secondary user device 116 may connect to the internet via the primary user device 110 but is also configured with other connection interfaces, e.g. a phone network connection interface. As explained above in relation to FIG. 2A, the secondary user device 116 is paired with the remote computing device 112 to create a secure communication channel 119a between the two devices. In this example, the secure communication channel 119a is via a mobile phone network and the internet (at least in part).

The secondary user device 116 is also connected to the primary user device 112 using any suitable connection e.g. a wireless link such as Wi-Fi or Bluetooth. Thus a communication channel 119b is also formed between the primary and secondary user devices. Together, the channels 119a, 119b form a second communication channel which allows messages and responses to be communicated between the remote computing device and the primary user device to enable the fault with the primary user device to be identified and if possible remotely fixed. Thus, in effect a link is established between the remote computing device and the user's equipment even though the standard internet connection is not available.

FIG. 3A is a flowchart setting out the steps for a remote computing device to connect to a faulty primary user device, e.g. a router or a faulty additional user device which is connected to the primary user device. Both of the primary and additional user devices are located behind a fire wall. Once connected, tests may be performed to identify the faults and/or to perform any necessary remedial action(s). The method is similar to that of FIG. 2A and thus in a first step S300, a remote computing device of the support centre receives a request for support from a user on their secondary user device. A secure connection is then established between the remote computing device and the secondary user device (step S302). The remote computing device sends a command (step S304) to the secondary user device which creates a connection between the secondary user device and the primary user device and hence to the additional user device which is already connected to the primary user device.

An optional confirmatory message may be returned to the remote computing device over the new communication channel, i.e. via the secondary user device (step S306). As shown in step S308, the remote computing device can then issue commands to the primary user device via the secondary user device and/or commands to the additional user device via the secondary and primary user devices. There may be a response from which device received the command to the remote computing device (step S310). The method concludes when it has been determined whether the fault is remotely fixable (step S312).

Figure 3B:
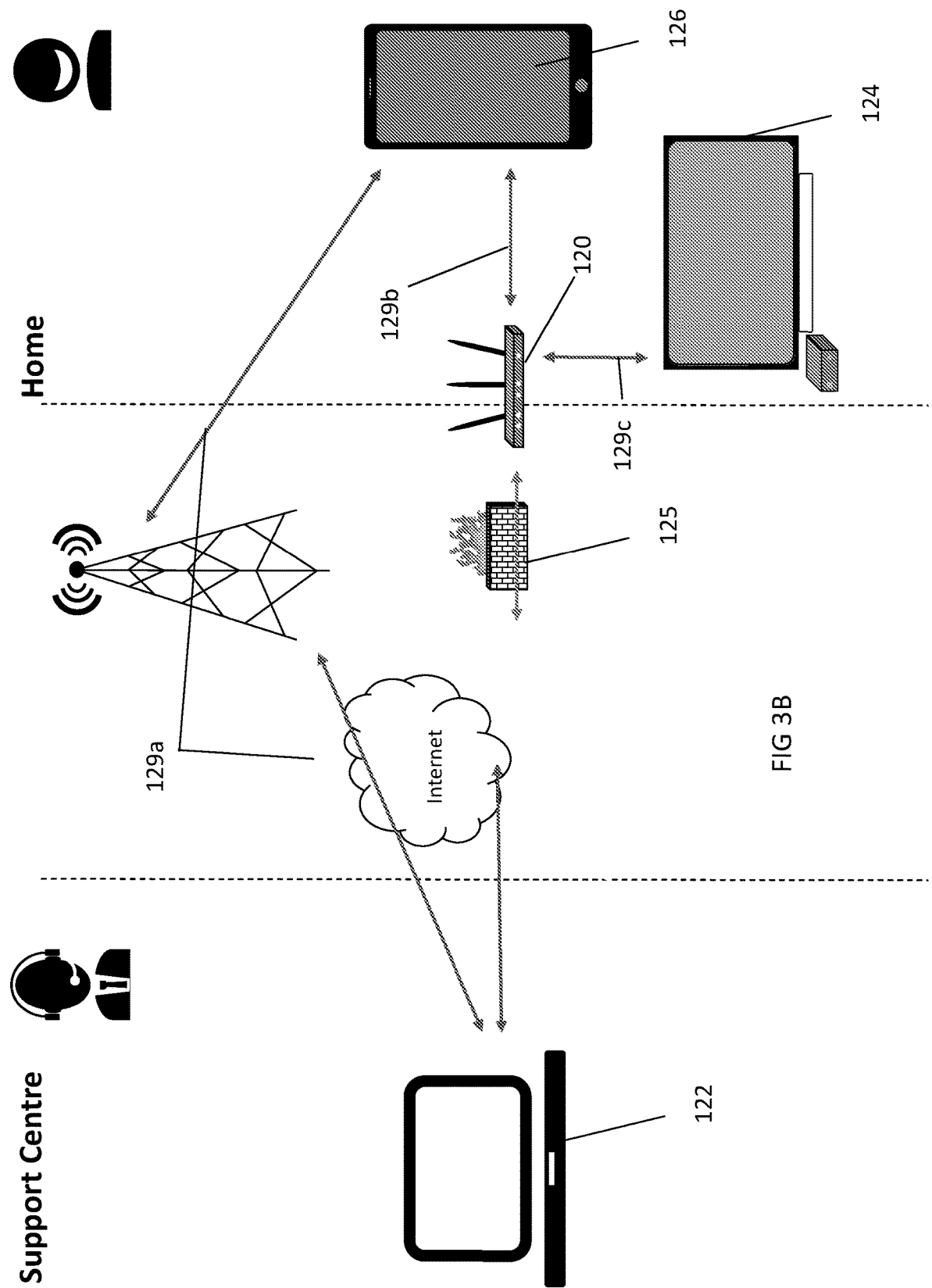
FIG. 3B is a schematic block diagram of a system in which the method of FIG. 3A may be carried out.

FIG. 3B is a schematic block diagram of a system which implements the method of FIG. 3A. The system comprises a primary user device 120 which in this example is a router configured to connect one or more additional user devices 124 to the internet. Both of these devices 120, 124 are connected to the internet via a firewall 125. The system also comprises a remote computing device 122 which is located in a support centre which the user contacts to fix the primary user device 120 and/or the additional user device 124. In this arrangement, it is not possible for the remote computing device 122 to connect to the primary user device 120 via the internet to directly diagnose any faults because this route of communication is prohibited by the firewall 125.

The system also comprises a secondary user device 126 in the form of a mobile device. As before, the secondary user device 126 is configured with other connection interfaces, e.g. a phone network connection interface. As explained above in relation to FIG. 3A, the secondary user device 126 is paired with the remote computing device 122 to create a secure communication channel 129a between the two devices. In this example, the secure communication channel 129a is via the phone network and via the internet (at least in part). A communication channel 129b is also formed between the primary and secondary user devices and there is also a communication channel 129c between the primary user device and the additional user device. As before, these communications between the user devices can be via any suitable connection e.g. a wireless link such as Wi-Fi or Bluetooth. For example, a Bluetooth connection may be used by the secondary user device to connect to an additional user device such as a vehicle entertainment system and/or a vehicle management system (e.g. to diagnose a problem with the vehicle).

Together, the channels 129a, 129b form a second communication channel which allows messages and responses to be communicated between the remote computing device and the primary user device to enable the fault with the primary user device to be identified and if possible remotely fixed. Similarly, the channels 129a, 129b, 129c form a second communication channel which allows messages and responses to be communicated between the remote computing device and the additional user device to enable the fault with the additional user device to be identified and if possible remotely fixed. In other words, the remote computing device effectively establishes a connection to the user's device from inside the user's network and thus may have unrestricted access to the devices. Issues with the network firewalls are thus bypassed even though connections from outside the network would be prevented or restricted by such firewalls. It is also noted that although unrestricted access may be achieved, the secondary user device might only allow limited access for user privacy reasons. A policy decision based on the particular scenario may be taken.

Figure 3C:
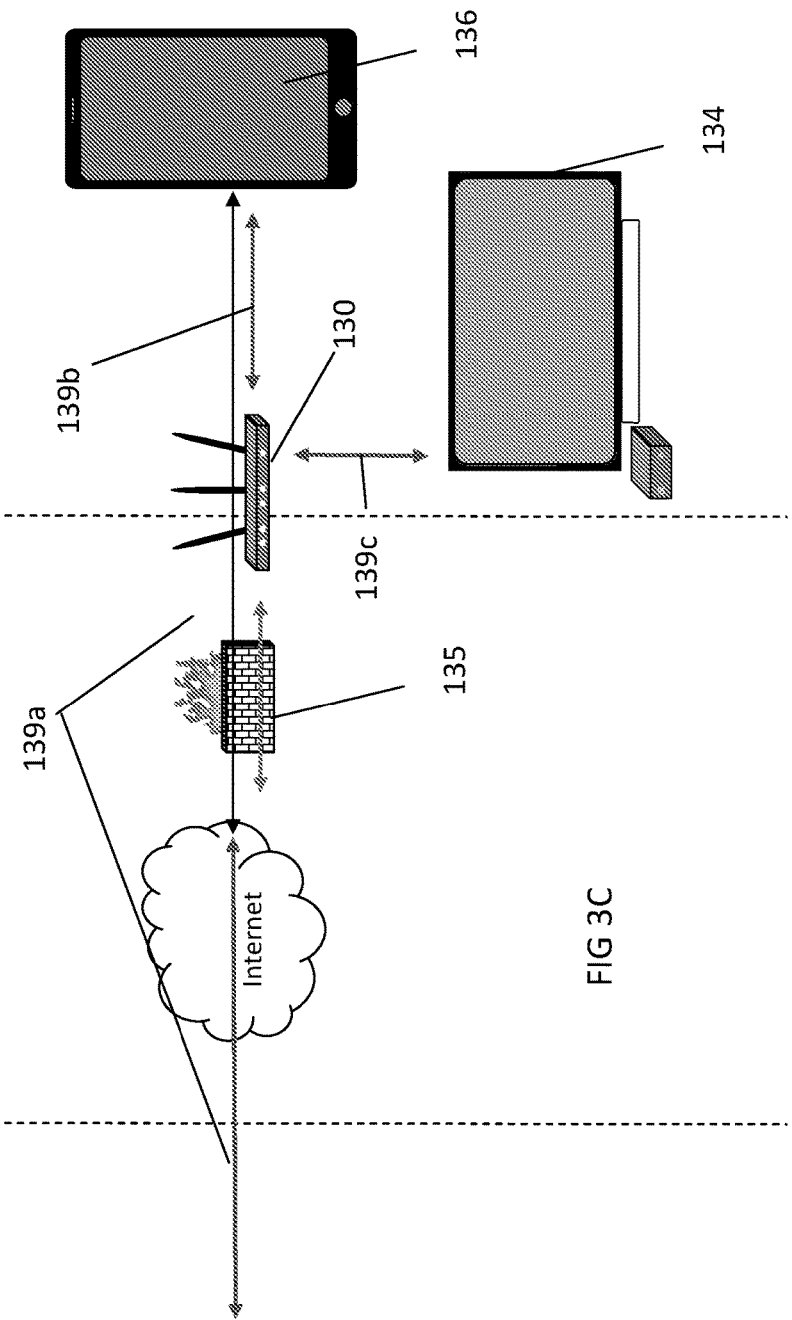
FIG. 3C is a schematic block diagram of an alternative system in which the method of FIG. 3A may be carried out.

FIG. 3C is a schematic block diagram of a system which implements the method of FIG. 3A. The system is similar to that in FIG. 3B and thus comprises a primary user device 130, a secondary user device 136 and one or more additional user devices 134 in a user's environment and a remote computing device 132 in a support centre. Again there is a firewall 135 between the primary user device 130 and the internet.

As before, the secondary user device 136 is configured with other connection interfaces and the secondary user device 136 is paired with the remote computing device 132 to create a secure communication channel 139a between the two devices. In this example, there is no internet access via the primary user device 130, i.e. via the local Wi-Fi, even though the internet connection is working as expected. This is because the firewall 135 prevents the remote device 132 from the connecting via the primary user device 130 to the additional user device 134.

A communication channel 139b is also formed between the primary and secondary user devices and there is also a communication channel 139c between the primary user device and the additional user device. Together, the channels 139a, 139b form a second communication channel which allows messages and responses to be communicated between the remote computing device and the primary user device via the secondary user device. Similarly, the channels 139a, 139b, 139c form a second communication channel which allows messages and responses to be communicated between the remote computing device and the additional user device via the secondary user device. The final parts of the second communication channel, namely channels 139b and 139c are behind the firewall. Accordingly, this configuration can be used by the remote computing device to gain unrestricted access to the primary user device because the final relay hop (e.g. channel 139b) is from the secondary user device which is behind the firewall. In other words, there is a secure connection 139a from the remote device to the secondary user device 136 created through the firewall 135 and connections from the secondary user device 136 to both the primary user device 130 and the additional user devices 134 because all the user devices are behind the firewall 135.

Figure 4A:
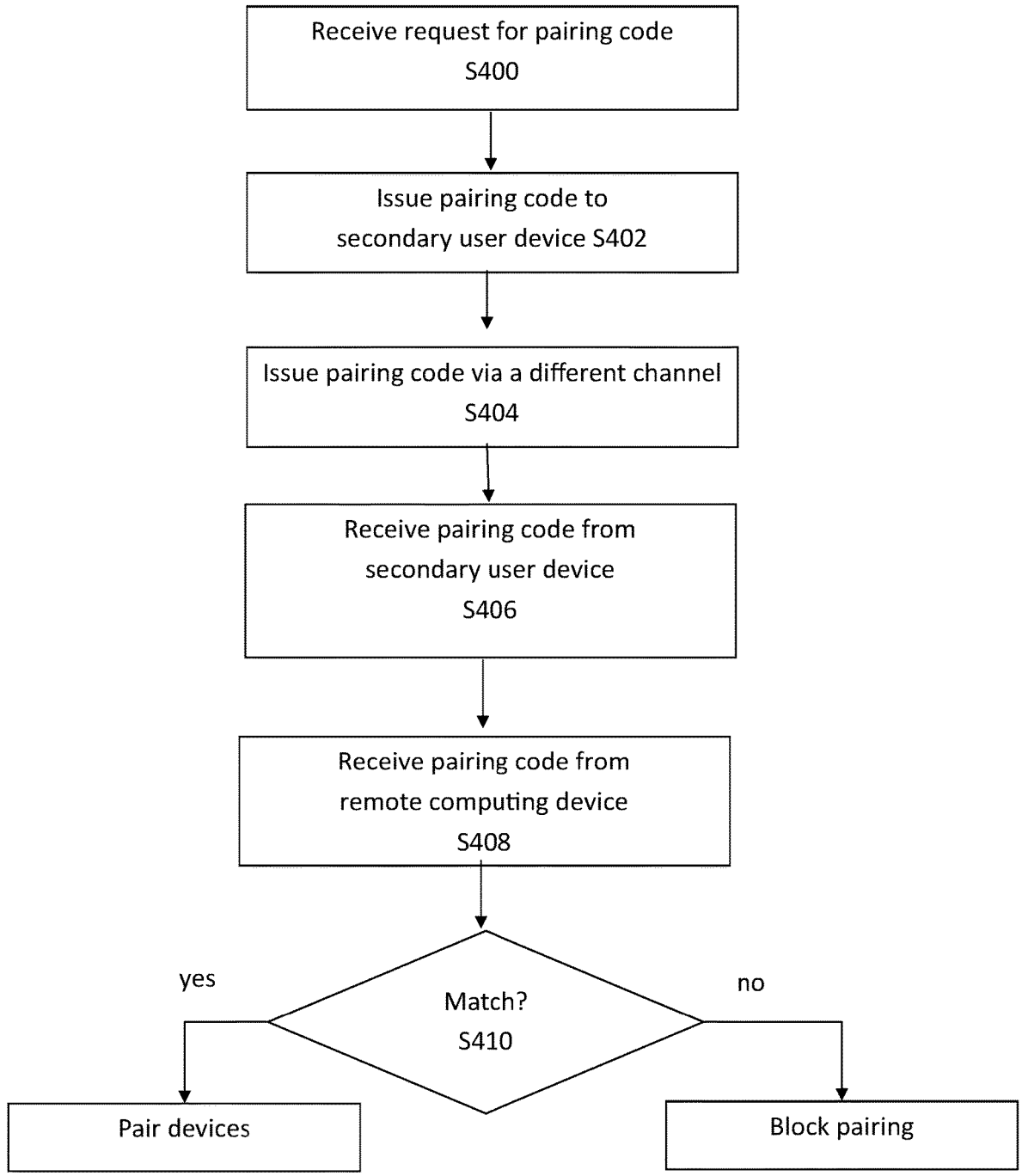
FIG. 4A is a flowchart showing a method for pairing devices in the systems of FIGS. 2B, 2C and 3B.

FIG. 4A shows a flowchart for the method of pairing the remote computing device at the support centre with the secondary user device (i.e. the mobile device). The establishment of a secure second communication channel between the two devices is an advantage of the invention and allows the remote computing device to find the secondary user device. In an initial step, a pairing server receives a request for a pairing code from the secondary user device (step S400). This request may be generated by an app running on the secondary user device. The pairing code may be a randomly generated one time code (PTC) or other securely generated code. The pairing code is issued to the secondary user device at step S402. The pairing code is then displayed on the secondary user device, e.g. in the user interface for the app.

The pairing code is also sent separately to the remote computing device (step S404). The separate channel may be via the user speaking to the agent controlling the remote computing device over the phone or via other channels, e.g. via a text message or online chat from the secondary user device. The secondary user device also contacts a relay server which forms at least part of the communication channel for relaying messages between the secondary user device and the remote computing device. The secondary user device sends the relay server the pairing code it has received (step S406). Once the pairing code is entered into the remote computing device, it is passed by the remote computing device to the relay server or another relay server which is connected to the first relay server (step S408).

There may be two relay servers involved in passing messages between the two devices—a first relay server which is connected to the secondary user device and a second relay server which is connected to the remote computing device and the first relay server. These relay servers may initially have no knowledge of one another but use the pairing codes received from the respective devices to pair and hence connect the devices. As shown at step S410, there is a determination as to whether the pairing code received from the secondary user device matches (i.e. is identical) to the pairing code received from the remote computing device. This determination may be done in one or both of the first and second relay servers.

Figure 4B:
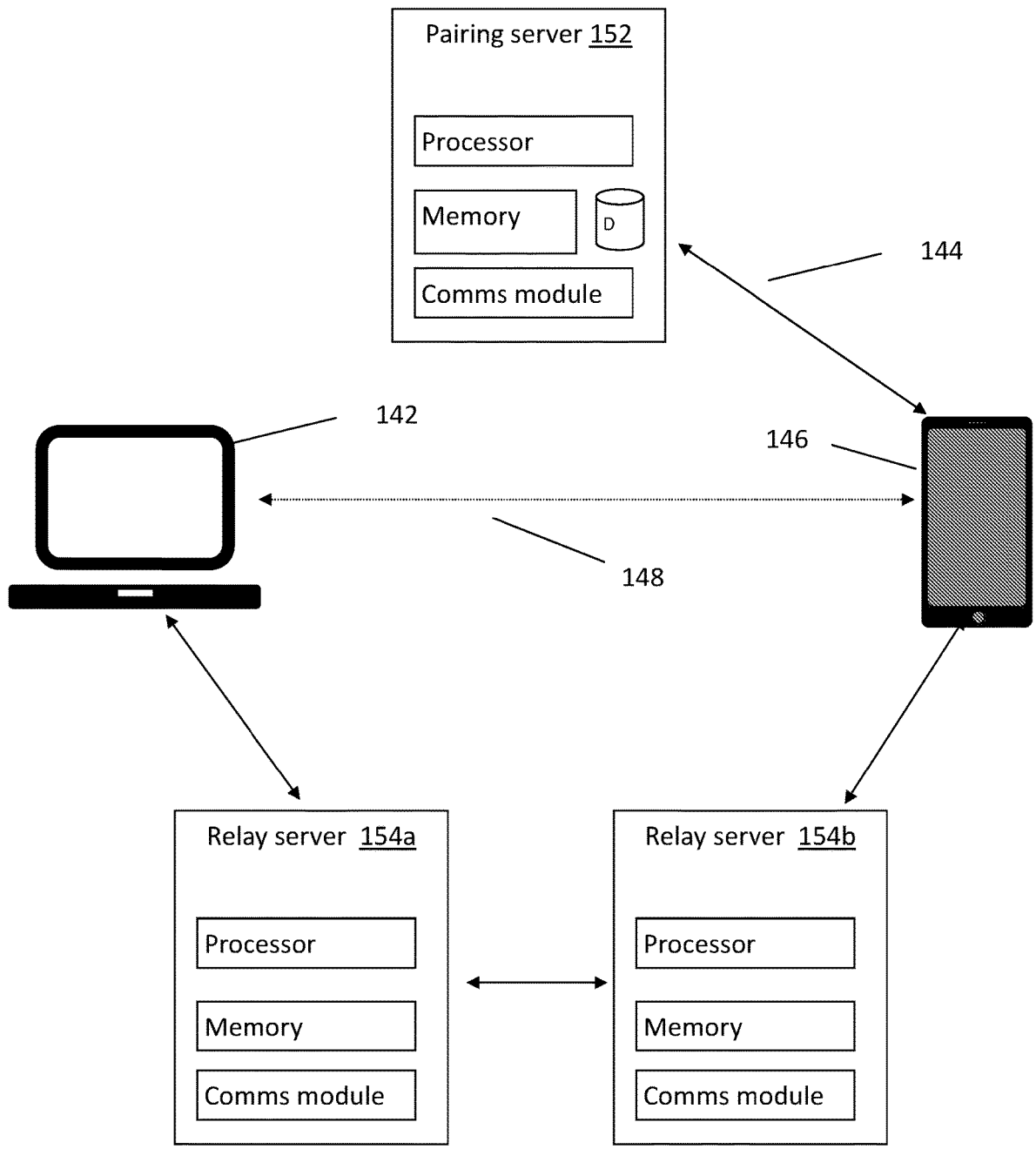
FIG. 4B is a schematic block diagram of a system in which the method of FIG. 4A may be carried out.

FIG. 4B shows a schematic block diagram of a system for implementing the pairing method of FIG. 4A. The secondary user device 146 is connected to the pairing server 152 via a first communication channel 144, e.g. a channel which is opened by activating an app as described above. The first communication channel 144 is used to communicate the pairing code to the secondary user device 146 from the pairing server 152 on request. A second communication channel 148 is schematically shown between the secondary user device 146 and the remote computing device 142. The second communication channel may be verbal, or use other means to communicate the pairing code from the secondary user device 146 to the remote computing device 142.

In this arrangement, each of the secondary user device 146 and the remote computing device 142 are shown connected to respective relay servers 154b and 154a. Each relay server represents one of a plurality of intermediate systems which can chained together to pass messages from the remote computing device to the secondary user device (and hence to the primary user device(s)). The relays may be hosted in different locations and under different environments. For example, the relays may be hosted on the internet (i.e. in the cloud) and/or on the secondary user device.

Although only a single pairing server and a single pair of relay servers is shown, the number of relay and pairing servers may be scaled depending on how busy the system is. There could be single or multiple instances (i.e. copies) of the pairing server. Similarly, there could be single or multiple instances (i.e. copies) of the relay server. Although the pairing server and relay servers are shown as separate devices, it will be appreciated that the functions of the relay servers and the pairing server may be fulfilled by a single device. Similarly, the function of each server may split across multiple devices. Each of the pairing servers and the relay servers has the standard components such as a processor (i.e. microprocessor, central processing unit (CPU) or similar hardware, memory and communications modules to allow the communication. The memory may comprise volatile memory and/or non-volatile memory. Volatile memory is computer memory that requires power to maintain the stored information unlike non-volatile memory. Volatile memory thus retains its contents while powered on but when the power is interrupted, the stored data is quickly lost. It will be appreciated that each of the user devices and the remote computing device also has similar standard components. The pairing server may further have a database D that is shared between the various instances, i.e. copies, of the server. The database may be used to track valid pairing codes and which relay server each secondary user device is connected.

Figure 5:
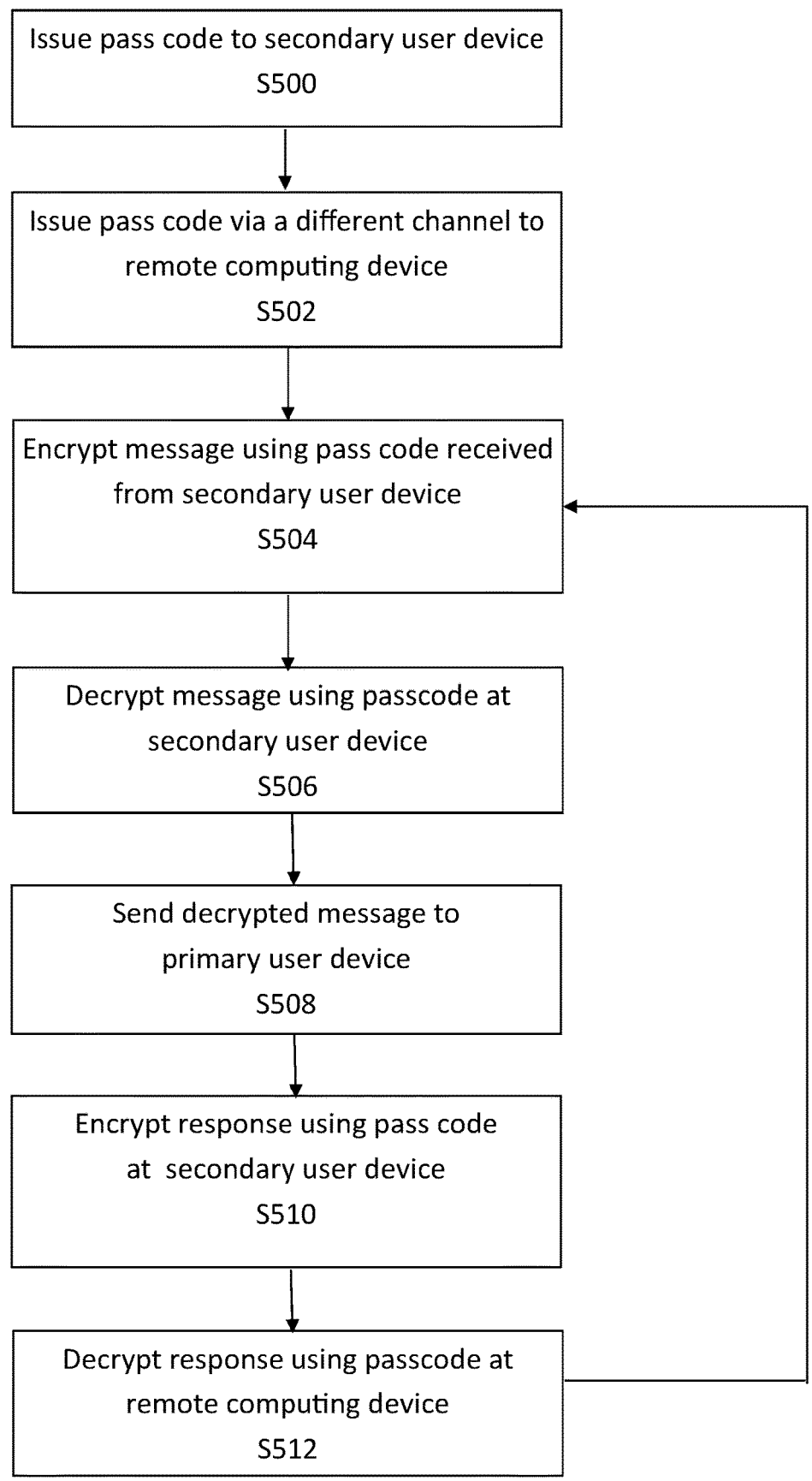
FIG. 5 is a flowchart showing a method for enhancing security when pairing devices in FIG. 4A.

FIG. 4A explains how devices are paired using a pairing code. In FIG. 5, an extra layer of security is shown to authenticate the remote computing device (i.e. the agent) with the secondary user device (i.e. the user). In this example, a one-time code (OTC) termed a pass code is used for authentication and to prevent eavesdropping by a third party. In the first step the pass code is issued to the user of the secondary user device (step S500). For example, the pass code may be randomly generated on the secondary user device and displayed to the user. The pass code is then issued via a different channel to the remote computing device (step S502). For example, the pass code may be communicated verbally by the user to the agent operating the remote computing device, e.g. at the same time as communicating the pairing code. An alternative mechanism may be used but it is essential that the pass code is not communicated in the clear between the devices.

Once the pass code has been successfully shared, messages and responses between the remote computing device and the secondary user device may be sent in encrypted form using the pass code or encryption derived from the pass code. As shown at step S504, the remote computing device encrypts a message using the pass code and sends it to the secondary user device. The message may be a command to run a diagnostic test or a change to the set-up on the primary user device or other user device. At step S506, the message is decrypted using the pass code. If there is any interception of the message at the relays or other parts of the communication path, the intercepting components will not be able to decrypt the message because they do not know the pass code. Furthermore, any alternation of the message by intercepting components means that the decryption will fail at the secondary user device.

Once the message is decrypted, it is sent to the primary user device (step S508) or to the other user device which may be faulty. A response is received and this is encrypted by the secondary user device using the pass code (step S510) before sending to the remote computing device. Once received at the remote computing device, the response can be decrypted (step S512). Accordingly, end-to-end encryption is used for the communication between the two devices. Once the response is received, another message can be sent and the process of steps S504 to S512 may repeat until the fault is diagnosed and if possible rectified. Although the iteration is shown as discrete loops of command message being sent and response received, for performance reasons the remote computing device does not have to wait until the response from one command message has been received before sending the next command message. The remote computing device may be send each command message at any time and may batch command messages to send as groups of messages. Similarly, each response may be sent independently of the other responses, regardless of whether or not the command messages were batched, and the responses may be sent in any order, not just the order in which the command messages were sent.

The mechanism used above to authenticate communication between the two devices may be a standard mechanism, e.g. secure remote password (SRP) such as that developed by Stanford University. It will be appreciated that other similar mechanisms could be used to secure the communication.

Figure 6:
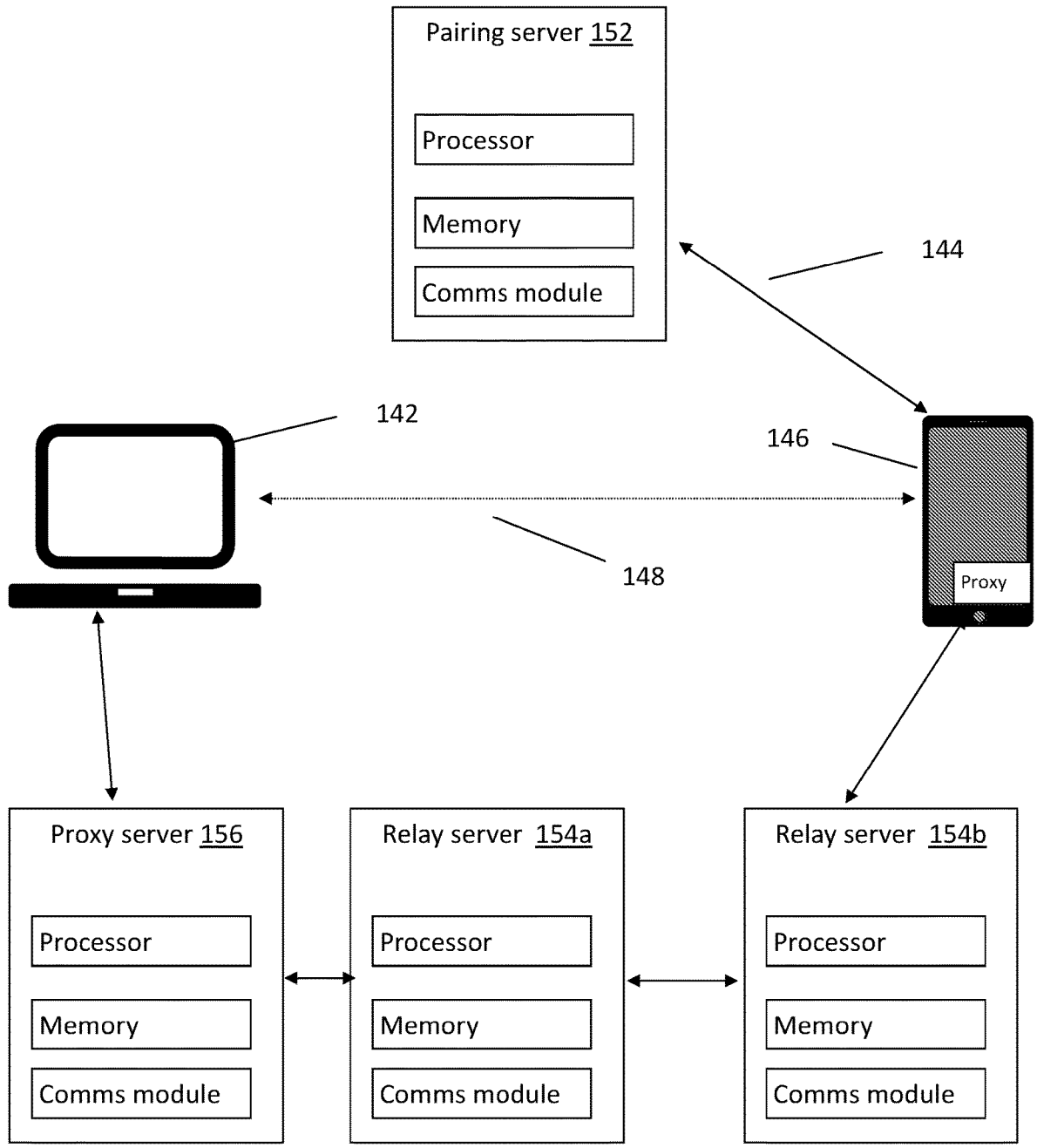
FIG. 6 is a schematic block diagram which is a variant of that shown in FIG. 4B.

FIG. 6 is a variant of the system shown in FIG. 4B and the same components have the same numbering. Thus as described above, the secondary user device 146 is connected to the pairing server 152 via a first communication channel 144 to communicate the pairing code to the secondary user device 146. A second communication channel 148 between the secondary user device 146 and the remote computing device 142 is used to communicate the pairing code from the secondary user device 146 to the remote computing device 142. In this arrangement, there is a proxy server 156 between the remote computing device 142 and its respective relay server 154a. The secondary user device is shown as directly connected to its respective relay server 154b but it will be appreciated that a similar variation could also be employed in this connection.

Many devices support a web based interface and the proxy server may be a webserver proxy in such an arrangement. The remote computing device opens a normal browser and connects to the proxy server 156 which may be running on the internet. HTTP (or HTTPS) commands from the browser operating on the remote computing device are packaged by the proxy server 156 and sent via the relay servers to the secondary user device as described above. There is also a proxy webserver on the secondary user device so that part of the process is running on the secondary user device. For example, the app on the secondary user device converts the packaged commands to HTTP/HTTPS commands and sends them to the problem device (e.g. the primary user device or the additional user device). This allows the agent using the remote computing device to interact and view webpages as if they were directly connected to the problem device. Responses are transferred back to the browser of the remote computing device in the same way.

It will be appreciated that HTTP commands are just one type of command that may be sent. The proxy server (or another mechanism) may also be used to package other bespoke commands, including commands in a custom protocol. The packaged commands will be interpreted by the secondary user device and used to construct custom commands for the problem device (e.g. the primary user device or the additional user device).

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of using a remote computing device to remotely diagnose a fault with a primary user device, the method comprising:
    receiving, at a remote computing device, a request from a secondary user device to diagnose a fault with the primary user device, wherein the request is received on a first communication channel and wherein the primary and secondary user devices are within a user environment and the remote computing device is located in a support centre which is not within the user environment;
    connecting, in response to the request, the remote computing device with the secondary user device using a secure communication channel which is different to the first communication channel;
    sending, from the remote computing device, a connection command to the secondary user device to connect to the primary user device using a third communication channel which is different to the secure communication channel and thereby allowing communication between the remote computing device and the primary user device via the secondary user device;
    sending a command message for the primary user device from the remote computing device to the secondary user device via the secure communication channel, wherein the command message is selected from a command to initiate a diagnostic test and a command to change a configuration setting and is sent from the secondary user device to the primary user device using the third communication channel; and
    receiving, in the remote computing device, from the secondary user device via the secure communication channel, any response to the command message issued by the primary user device;
    whereby the response is used at least in part to diagnose the fault.

2. The method of claim 1, wherein connecting using a secure communication channel comprises
    receiving a pairing code from the secondary user device over a primary channel;
    sending the received pairing code to a pairing server; and
    receiving confirmation from the pairing server that the pairing code is valid;
    wherein the pairing server validates the pairing code received from the remote computing device by determining whether there is a match with a second pairing code received from the secondary user device via a secondary channel.

3. The method of claim 1, further comprising
    encrypting the command message using a key shared with the secondary user device.

4. The method of claim 1 wherein the command message is a command to initiate a diagnostic test on the primary user device.

5. The method of claim 1, further comprising
    sending, based on the received response, a subsequent command message for the primary user device from the remote computing device to the secondary user device via the secure communication channel; and
    receiving, from the secondary user device via the secure communication channel, any response to the subsequent command message issued by the primary user device.

6. The method of claim 1, wherein the command message is a command to change a configuration setting on the primary user device.

7. The method of claim 1 further comprising
    receiving, in response to sending the connection command, confirmation that the primary user device is connected to the secondary user device; and
    sending the command message after the confirmation is received.

8. The method of claim 1, wherein the secure communication channel is via a mobile network.

9. The method of claim 1, wherein the third communication channel is a local wireless communication channel.

10. A non-transitory computer readable medium carrying program code which when running on a computing device causes the computing device to carrying out the method of claim 1.

11. The method of claim 1, wherein the sending a connection command to the secondary user device to connect to the primary user device using a third communication channel results in a new communication channel between the remote computing device and the primary user device via the secondary user device.

12. A method of using a secondary user device to remotely diagnose a fault with a primary user device, the method comprising:
- sending a request to diagnose a fault with the primary user device from a secondary user device to a remote computing device, wherein the request is sent over a first communication channel and wherein the primary and secondary user devices are within a user environment and the remote computing device is located in a support centre which is not within the user environment;
- connecting, in response to the request, the secondary user device with the remote computing device using a secure communication channel which is different to the first communication channel;
- connecting the secondary user device with the primary user device using a third communication channel which is different to the secure communication channel;
- receiving, at the secondary user device, a command message for the primary user device from the remote computing device via the secure communication channel, wherein the command message is selected from a command to initiate a diagnostic test and a command to change a configuration setting;
- sending the command message from the secondary user device to the primary user device over the third communication; and
- returning, using the secondary user device, any response to the command message received from the primary user device to the remote computing device, wherein the response is used at least in part to diagnose the fault with the primary user device.

13. The method of claim 12, further comprising
- receiving an encrypted command message which has been encrypted using a key shared with the remote computing device;
- decrypting the encrypted command message using the shared key; and
- sending the command message to the primary user device.

14. The method of claim 13, further comprising re-encrypting the command message before sending to primary user device.

15. A non-transitory computer readable medium carrying program code which when running on a computing device causes the computing device to use a secondary user device to remotely diagnose a fault with a primary user device by
- sending a request to diagnose a fault with the primary user device from a secondary user device to a remote computing device, wherein the request is sent over a first communication channel and wherein the primary and secondary user devices are within a user environment and the remote computing device is located in a support centre which is not within the user environment;
- connecting, in response to the request, the secondary user device with the remote computing device using a secure communication channel which is different to the first communication channel;
- connecting the secondary user device with the primary user device using a third communication channel which is different to the secure communication channel;
- receiving, at the secondary user device, a command message for the primary user device from the remote computing device via the secure communication channel, wherein the command message is selected from a command to initiate a diagnostic test and a command to change a configuration setting;
- sending the command message from the secondary user device to the primary user device over the third communication; and
- returning, using the secondary user device, any response to the command message received from the primary user device to the remote computing device, wherein the response is used at least in part to diagnose the fault with the primary user device.

* * * * *